US009592462B2

(12) United States Patent
Heidebrink (10) Patent No.: US 9,592,462 B2
(45) Date of Patent: Mar. 14, 2017

(54) ENGINE LUBRICANT HEATING AND/OR COOLING APPARATUS

(71) Applicant: Ron Heidebrink, Loris, SC (US)

(72) Inventor: Ron Heidebrink, Loris, SC (US)

( * ) Notice: Subject to any disclaimer, the term of this patent is extended or adjusted under 35 U.S.C. 154(b) by 0 days.

(21) Appl. No.: 15/076,594

(22) Filed: Mar. 21, 2016

(65) Prior Publication Data

US 2016/0271534 A1    Sep. 22, 2016

Related U.S. Application Data (60) Provisional application No. 62/135,334, filed on Mar. 19, 2015.

(51) Int. Cl.
| | |
|---|---|
| *B60H 1/03* | (2006.01) |
| *B01D 35/18* | (2006.01) |
| *F01M 5/00* | (2006.01) |
| *F01M 11/03* | (2006.01) |
| *F02N 19/10* | (2010.01) |
| *F02B 3/06* | (2006.01) |
| *F02N 19/02* | (2010.01) |
| *F01P 11/20* | (2006.01) |

(52) U.S. Cl.
CPC ............ *B01D 35/18* (2013.01); *F01M 5/001* (2013.01); *F01M 5/002* (2013.01); *F01M 11/03* (2013.01); *F01M 2011/033* (2013.01); *F01P 11/20* (2013.01); *F01P 2060/18* (2013.01); *F02B 3/06* (2013.01); *F02N 19/02* (2013.01); *F02N 19/10* (2013.01)

(58) Field of Classification Search
CPC .. F02N 19/10; F02N 19/02; F02B 3/06; F01P 11/20; F01P 2060/18
USPC .................................................. 123/142.5 R
See application file for complete search history.

(56) References Cited

U.S. PATENT DOCUMENTS

| | | | | |
|---|---|---|---|---|
| 3,529,719 A | * | 9/1970 | Gravbill ............ | B01D 21/0012 208/182 |
| 2013/0068435 A1 | * | 3/2013 | Eppink ..................... | F28F 9/00 165/173 |

* cited by examiner

*Primary Examiner* — Hung Q Nguyen
*Assistant Examiner* — Charles Brauch
(74) *Attorney, Agent, or Firm* — P. Jeff Martin; The Law Firm of P. Jeffrey Martin, LLC (57) ABSTRACT

A heat transfer apparatus for cooling and/or heating engine lubricant, fuel, and engine oil is provided which includes a heat-transferring jacket. The heat transferring jacket includes a body having a plurality of fins. The body further includes an air-intake inlet, a plurality of air-exhaust outlets formed along the first lateral terminus and the second lateral terminus, and a means for securing the body to an oil filter.

7 Claims, 6 Drawing Sheets

ENGINE LUBRICANT HEATING AND/OR COOLING APPARATUS

I. RELATED APPLICATIONS

This application claims priority to U.S. Provisional Patent Application No. 62/135,334, filed on Mar. 19, 2015, the disclosure of which is hereby incorporated by reference in its entirety.

II. FIELD OF INVENTION

The present disclosure describes a heat transfer apparatus, and more particularly, a heat transfer apparatus for heating and/or cooling engine lubricant and fuel.

III. MOTIVATION OF THE INVENTOR

There have been numerous attempts to provide a device, apparatus, or article to reduce the operating temperature of engine lubricants and other essential fluids. In particular, many devices have been introduced to reduce the heat of engine oil, hydraulic oil, and/or diesel fuel as the lubricant is circulated through the engine block during use in the hope of extending the useful life of the engine lubricant and optimizing performance of the engine. Similarly, many devices have been introduced to provide heat to engine lubricant and/or fuel for safely starting engines in cold-weather environments.

One category of device used includes in-line mounted cooling systems having a heat-transfer arrangement of cool water conduit and hot engine oil conduit coming into contact in passing, the term, "passing" meaning such as commonly employed as a heat exchanger. In-line devices require placement and installation of a separate component as well as providing a source of cool water to operate as the heat-transfer medium. Accordingly, such in-line devices are often expensive to purchase and install for a typical automobile and equipment, and other types of equipment.

Another category of device includes filter-mounted coolers. In such devices, the engine oil is circulated through the oil cooling apparatus before or after circulation through the oil filter, utilizing cool water and/or glycol as the heat transfer medium. Similar to the in-line mounted systems, the filter-mounted coolers require separate sourcing of cool water or glycol, and are similarly expensive to purchase and install.

Not surprisingly, combination kits, having in-line heat-transfer block arrangements along with a filter-mounted apparatus for additional cooling are also known in the art and offered for commercial purchase. However, such combination kits are more expensive than single-component kits and consume more engine compartment space than the single-component kits previously mentioned. Often, such space is not available in the stream-lined motor compartments in passenger automobiles and other types of equipment sold today.

Similarly, in-line, filter-mounted, and combination heat transfer apparatuses or devices for supplying heated air to engine lubricant are known in the art to help facilitate safe engine starts in cold weather. Typically, a heat source, one or more hoses, and other components are utilized to deliver heated air to an engine block and/or other components to heat the lubricant to a temperature near safe operation.

However, like the engine cooling apparatuses, the engine heating apparatuses suffer from the same or similar issues, including cost and space consumption. Moreover, after-market installations that include changes or additions of lubricant hoses and the like create the possibility of leakage and failure, and may have the effect of voiding any remaining warranty covering the engine.

Accordingly, there is an unresolved need for better engine lubricant heating and/or cooling options that efficiently heat or cool engine lubricant at a minimum of expense to the owners and/or operators of automobiles and equipment.

IV. SUMMARY

It is envisioned that the heat transfer jacket described herein may be used in a variety of engines, including gasoline, diesel, methane (natural gas), propane, or other similar fuels for internal combustion engines, as well as in a variety of automobiles or conveyances, including passenger vehicles, motorcycles, boats, commercial hauling vehicles (vans, trucks, tractor-trailers), auto and motor racing equipment, construction equipment, airplanes, farm equipment, and the like. It is envisioned that the design and installation of the heat transfer jacket forces cool air about the oil filter (or other engine component), and through active cooling and the transfer of heat to the elements of the jacket (including the walls and fins), the oil filter and the oil circulating through the filter will be cooled to an appropriate temperature for engine operation.

The use of a filter-mounted (or filter-supported if integrally manufactured as a single unit) heat transfer jacket that omits the need for water, glycol, or another cooling agent reduces the cost to make and install the article, thereby reducing the price and ease of installation to the consumer. Because there is no mechanical modification to the oil filter, either through changes to the filter and/or in-line additions to the oil-flow pathway, there is no risk of introducing oil and/or fluid leakage, unwanted fluctuations in fluid pressure and/or temperature, and therefore no failure of the filter and/or engine.

VI. DESCRIPTION OF THE EMBODIMENT(S)

Figure 4A:
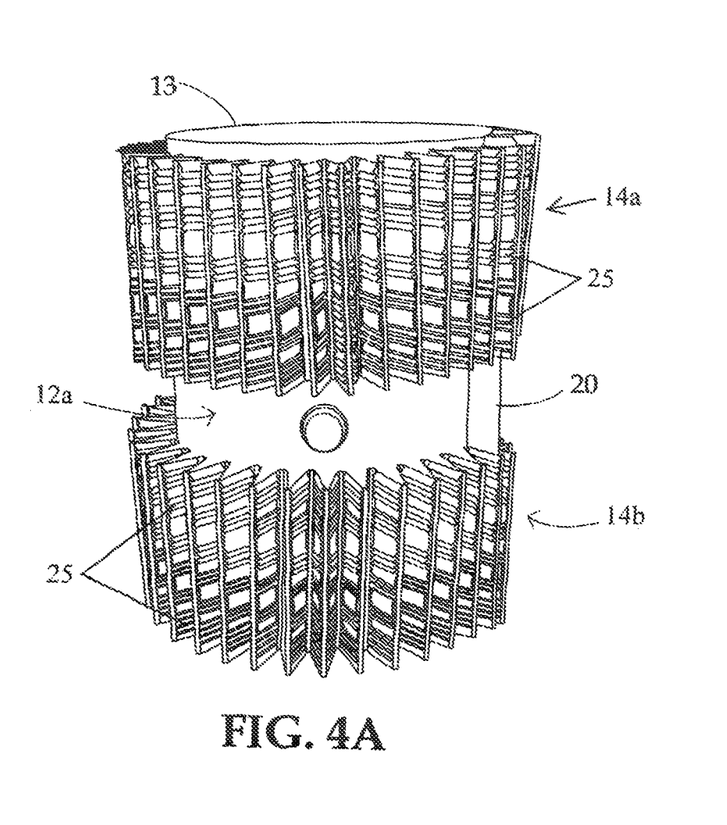
FIG. 4A is a side view of another alternative embodiment of the jacket depicted in FIGS. 1, 2, 3A, and 3B.
Figure 4B:
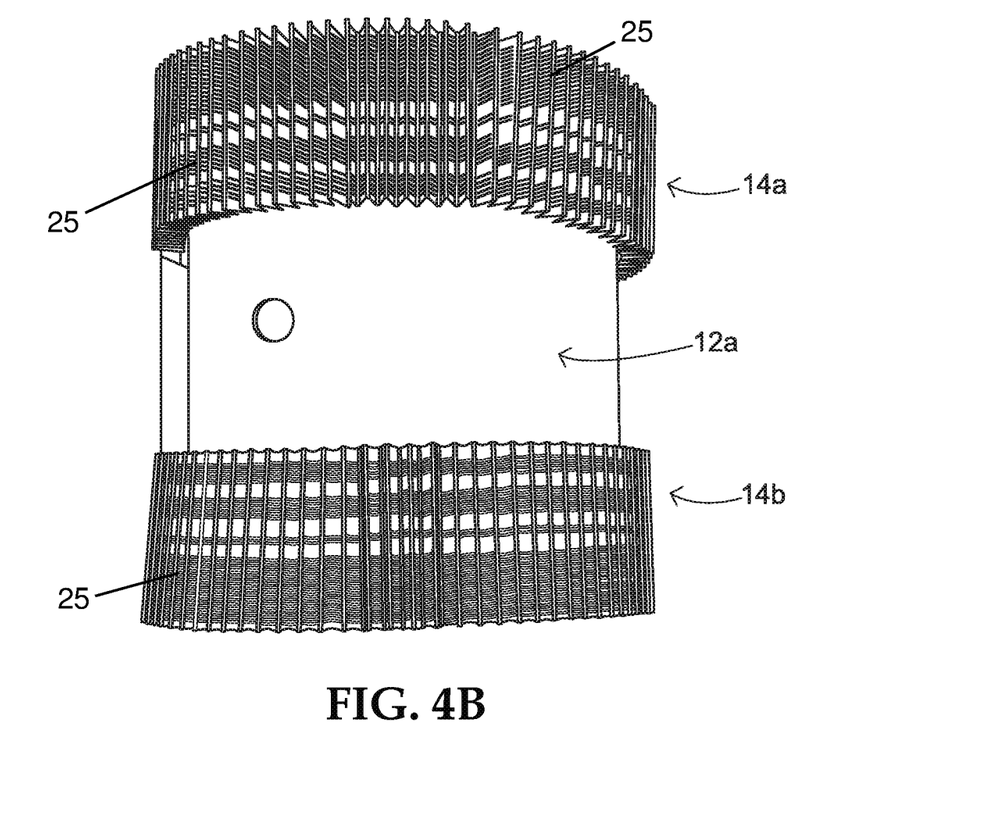
FIG. 4B is a side view similar to the alternative embodiment of the jacket depicted in FIG. 4A.

Because most oil filters for passenger vehicles, including most light vehicles and some heavy vehicles, as well as motorcycles and/or mopeds have a substantially cylindrical shape, generally consistent with the filter depicted in FIG. 4B for example, it is envisioned that the heat transfer jacket 10 described herein is adapted to the cylindrical shape. Typically, though not limiting to the description and/or claims included herein, an oil filter includes a canister housing coupled to a base plate having a gasket retainer and expandable gasket seal, the housing and base plate comprising a center tube having filter media and one or more bypass means. However, the heat transfer jacket 10 is not limited to such a shape, or to the specific oil filter described above, since specialty oil filters are available that depart from the standard configuration, such as being substantially (but not completely) cylindrical from head-to-tail and/or about the circumference of the filter. Accordingly, the heat transfer jacket 10 is envisioned as adaptable to accommodate unconventional shaping of oil filters, as will be described in greater detail herein. Moreover, the heat transfer jacket 10 may be an after-market component independently sold for installation on existing commercially-available oil filters, or, alternatively, may be included as an integrated component of an oil filter line of manufacture.

As depicted in FIGS. 1-3B, and in accordance with at least one embodiment envisioned herewith, a heat transfer jacket comprises a body 12 having a plurality of fins 14 disposed therein, an air-intake inlet 16, and a plurality of air-exhaust outlets 18. The heat transfer jacket 10 may also include means for coupling the jacket 10 to a commercially available oil filter OF.

In one embodiment, contemplating either installation or integration with a cylindrically-shaped commercial-grade oil filter for passenger vehicles and the like, the body 12 comprises an inner-wall 12a and an outer-wall 12b disposed at a width to one another defined by the plurality of fins 14 arranged therein. The walls 12a and 12b and fins 14 may comprise aluminum, copper, or an aluminum-copper alloy. Other material suitable for transferring heat away from the oil filter OF (and from the inner-wall 12a outward toward the intervening fins 14 and outer-wall 12b) are also contemplated. Forming a substantially cylindrical body, the inner-wall 12a has an inner circumference smaller than the outer circumference of the outer-wall 12b. The fins 14 may be installed and secured between the walls 12a and 12b, including the use of adhesive(s), soldering, and/or other means for physically and mechanically securing the fins 14 between walls 12a and 12b. The walls 12a and 12b define a first lateral terminus 13 and a second lateral terminus 15 (more clearly depicted in FIG. 2), wherein each terminus 13 and/or 15 comprise one or more air-exhaust outlets 18 for releasing heat and heated air to the atmosphere.

Figure 1:
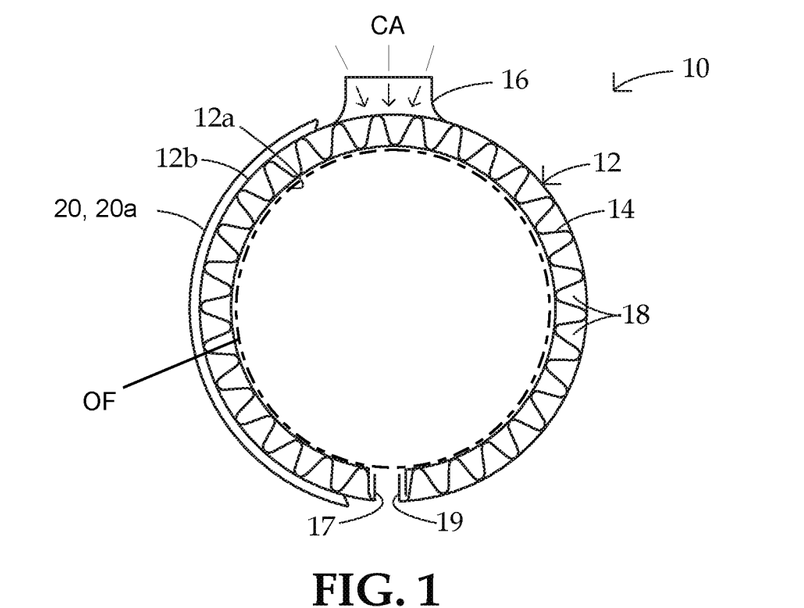
FIG. 1 is a top view (with a cross-section of the top-most part of the article) of a heat transfer jacket as disclosed in the description.
Figure 1A:
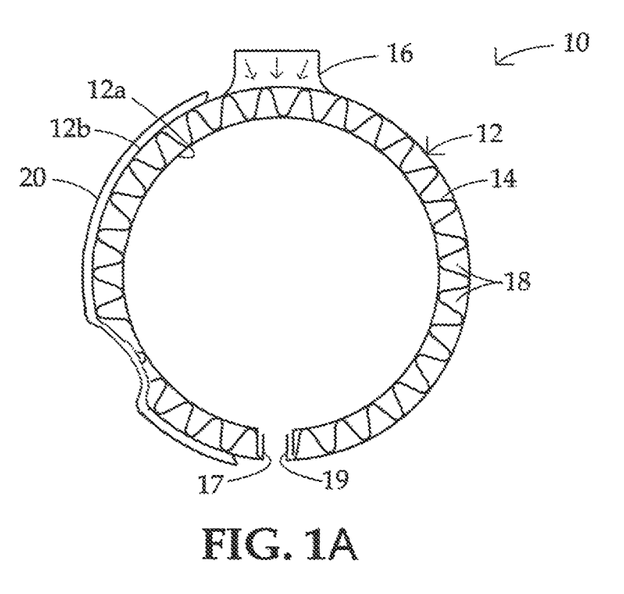
FIG. 1A is a top view of a heat transfer jacket, in accordance to an alternate embodiment of the present invention.

As also depicted in FIG. 1, the walls 12a and 12b may also define a first longitudinal terminus 17 and a second longitudinal terminus 19, whereby the walls 12a and 12b each terminate at the same points to form the respective longitudinal terminuses 17 and 19. It is envisioned that the body 12 may be substantially cylindrical and open (as depicted in FIG. 1), or substantially cylindrical and closed (not depicted), the jacket 10 would be slid over a free end of the oil filter OF. Although depicted as outlets 18 without a cap or covering, and open to the atmosphere, it is envisioned that a cap or covering may be utilized provided that the cap or covering includes an inlet for intake of cool air. It is further envisioned that the inner-wall 12a and outer-wall 12b may be shaped such that the distance therebetween may vary at or along any segment 360° about the body 12, or may be variable 360° about the body 12. FIG. 1A provides an exemplary illustration showing variation by the walls 12a and 12b of the body 12 along a curved segment thereof.

Figure 2:
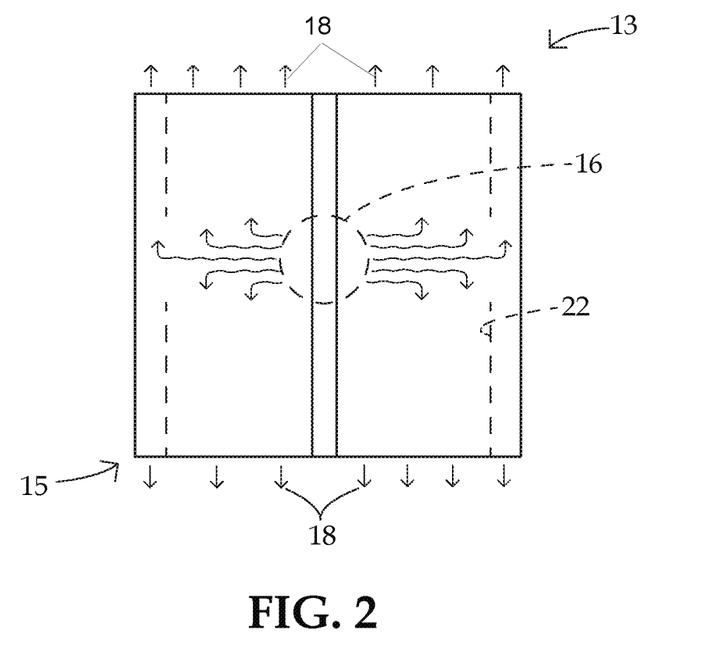
FIG. 2 is a side view of the article of FIG. 1.

The fins 14 may comprise a variety of shapes or forms (especially when viewed in cross-section as in FIG. 1). For example, FIG. 1 depicts the fins in cross-section as a continuous wave comprising crest-and-trough circumscribing the width between walls 12a and 12b. The fins 14 may be a single-run of material, or alternatively, multiple-repeating runs, installed as described above. It is also envisioned that the fins 14 may be z-shaped, tooth-shaped, or a variety of other ways when viewed in cross-section. As best depicted in FIG. 2, the fins 14 may be arranged to substantially circumscribe a top-half portion of the jacket 10 (and thus, oil filter OF) and substantially circumscribe a bottom-half portion of the jacket (and thus, oil filter OF), thereby defining a small channel 22 circumscribing the outer-wall 12b of the body 12, which is in fluid communication with the air intake inlet 16 (described in greater detail to follow). In addition, it is envisioned that the fins 14 may be arranged to traverse the body 12 (and walls 12a and 12b) from terminus 13 to terminus 15 without forming the channel 22. As best depicted in FIG. 4A and FIG. 4B, the fins may comprise a plurality of vents 25 arranged along the longitudinal length of the fins 14. The vents 25 may be arranged either perpendicular to or parallel to the longitudinal axis of the fins 14. As depicted in FIGS. 4A and 4B, the vents 25 are generally perpendicular to the longitudinal axis of the fins 14.

In one embodiment, the air-intake inlet 16 may be formed approximately mid-point along the length of the body 12 (and walls 12a and 12b), and thus mid-point between terminus 13 and terminus 15. In one embodiment, the inlet 16 may be in fluid communication with a channel formed along the inner circumference of the outer-wall 12b. In such an arrangement, it is envisioned that cool air CA will enter the inlet 16 and circumscribe the inner circumference of the outer-wall 12b along channel 22, thereby both cooling the oil filter OF disposed within the jacket 10 and forcing heated air from the oil filter, the inner-wall 12a, and the fins 14 and/or outer-wall 12b, and eventually forcing such heated air out through the outlets 18 at terminus 13 and terminus 15. Consistent with the description above, in an open (or non-cover) arrangement, the outlets 18 at terminus 13 and terminus 15 is generally defined by the air being forced between adjacent fins 14 as well as any residual heat (or heated-air) that dissipated from the upper surface of the fins 14 collectively.

Alternatively, the inlet 16 may be omitted in lieu of an air intake tube(s) or hose(s). The intake tube(s) or hose(s) may run through the fins 18 traversing (either in whole or in part) the terminal ends 13 and 15.

Optionally, envisioned for slower moving equipment (e.g., heavy-duty construction equipment), a 12 volt (DC), a 24 volt (DC), or voltage static blower may be coupled to the jacket 10. The static blower will provide additional forced-air introduced into the jacket 10 through inlet 16 on body 12.

Means 20 for securing the jacket 10 to an oil filter OF may take several forms. In one embodiment, depicted in FIG. 1, one or more hose clamp bands 20a may be used to compress and tighten the body 12 of the jacket 10 about the oil filter OF (FIG. 1 partially shows one clamp band 20a). It is envisioned that two bands could be used; one positioned about the top-half portion of the body 12 and the second position about the bottom-half portion of the body 12. In another embodiment, depicted in FIGS. 3A and 3B, means 20 comprises supports 20b disposed substantially parallel to the arrangement of the fins 14, wherein the supports 20b have multiple indexing apertures 20aa used to secure mechanical or other means to clamp the longitudinal terminuses 17 and 19 together. As but one example, consistent with the illustration in FIG. 3A, the terminuses 17 and 19 are secured by mechanical fasteners 21 (e.g., screws). In another embodiment, one or more magnets may be placed along the inner circumference of the inner-wall 12a at one or multiple places to magnetically secure the body 12 to the oil filter OF.

The inclusion of rare earth magnets may also add the benefit of assisting the filter media in trapping fine metal components that become part of the oil reservoir pool during the course of use. It is also envisioned that the body 12 may be constructed to include returnably-resilient material so that in an open-end configuration (as that depicted in FIG. 1), the body 12 may be slightly opened to secured the jacket 10 to the oil filter OF, but through the resilient material, the body 12 would return in such a way as to securely fit about the oil filter OF.

As depicted in FIGS. 4A and 4B, in an alternative embodiment, the fins 14 are mutually coupled with the outer circumference of the inner-wall 12a, and with the outer-wall 12b removed. Moreover, the fins 14 are separated into a top-half portion 14a and a bottom-half portion 14b.

Figure 3A:
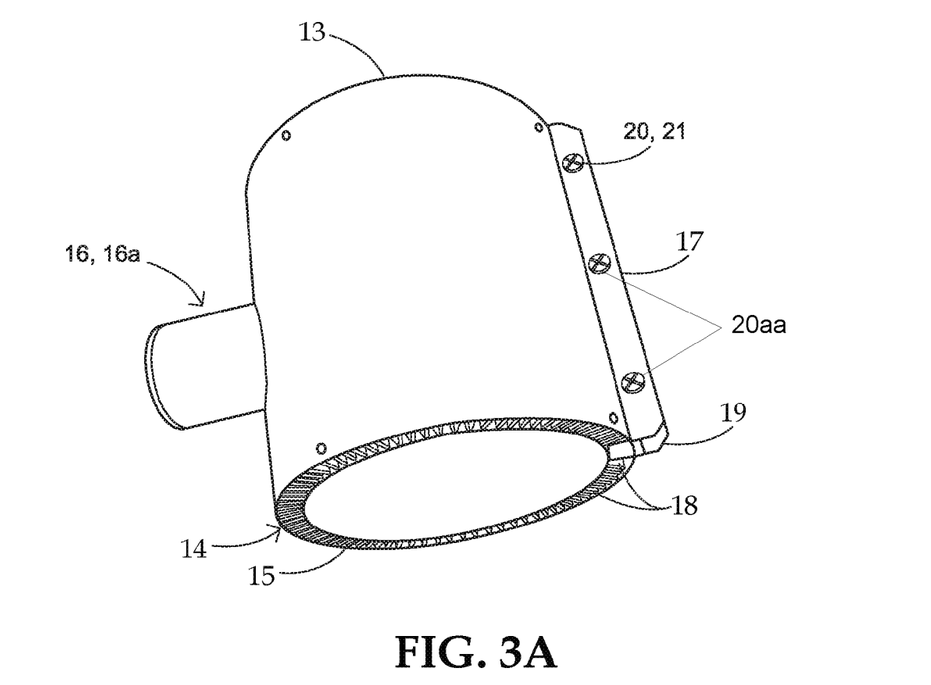
FIG. 3A is an alternative embodiment of the jacket depicted in FIG. 1 and FIG. 2.
Figure 3B:
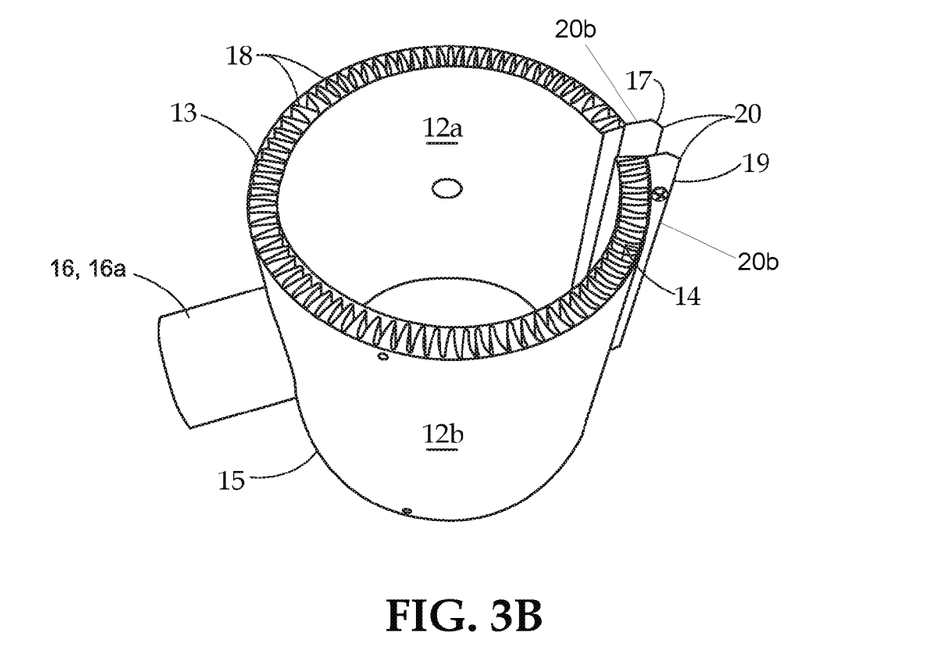
FIG. 3B is a perspective view of FIG. 3A.
Figure 5A:
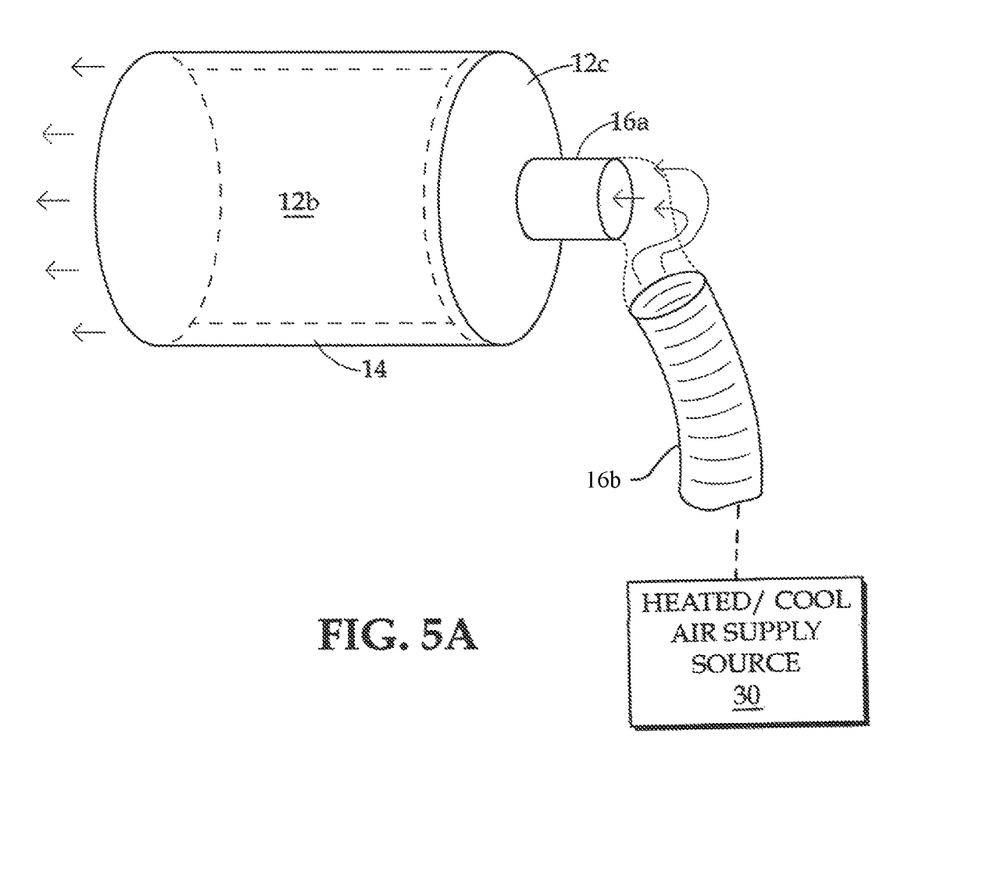
FIG. 5A is a perspective view of still another alternate embodiment of the present invention.

In reference to FIGS. 3A and 3B, and more particularly FIG. 5A, in accordance to another embodiment, the body 12 of the jacket 10 comprises an integral end cap or cover 12c having an air-intake collar 16a extending integrally therefrom. Heated or cool air (which may be provided respectively via a heat supply source or ambient air) may be directed into and through the air-intake collar 16a via a hose 16b or tubing detachably coupled between and in fluid communication with the heated/cool air supply source 30 and air-intake collar 16a. Thus, in accordance to one exemplary embodiment, cool air CA may be induced through the first lateral terminus 13 via the air-intake collar 16a and exhausted through the second lateral terminus 15.

In accordance to yet still another embodiment, it is envisioned that an insulative cover, sleeve, or jacket may also be used as an insulator when the vehicle (including heavy industrial machinery and equipment, aircraft, and the like as previously disclosed herein) is in operation and when not in operation, particularly in extreme climates characterized by frigid, extremely low temperatures. In this manner, the insulative cover configuration may sufficiently retain some level or degree of heat generated during operation to help heat resting engine oil and/or other lubricants, and particularly during vehicle/machinery operation when engine oil and other lubricants are circulated throughout the engine and other various mechanical components. It is believed that under such conditions, the lubricants receive sufficient heat above ambient temperatures to allow for cold start-up that turns over more quickly and without the strain and potential harm often associated with cold start-ups at cold to very cold ambient temperatures.

According to one exemplary embodiment, the insulative cover is wrapped around the oil filter OF (shown in FIG. 4B), or jacket 10 (shown in FIGS. 1, 3A, and 3B) so as to envelop a substantial majority of the external wall or external circumferential sidewall thereof. A means for detachably securing the insulative cover in the wrapped position is disclosed, the securing means comprising a member of the group which includes, but is not limited to, adhesive (such as for adhering the opposed free side edges of the cover to one another), clips, fasteners, coupling devices, biased metal annular holders, metal bands, and other suitable fastening devices.

In accordance to one embodiment, the insulative cover may be constructed of a flexible or semi-flexible material forming a panel structure. The construction material may selected from the group which includes, but is not limited to, liquid-crystal polymers, composite thermoplastics, silicone, polyester, and polyester fiberglass resin systems, and combinations thereof.

The insulative cover structure may further comprise a fibers matrix for reinforcing the cover. The reinforcing fibers or matrix of fibers may be broadly described as fiber-reinforced plastics, the reinforced fibers may be selected from the group which includes, but is not limited to, polyester-polyarylate (sold commercially under the trademark Vectran®), polyphenylene sulfide, polyimide, polyamide-imide, polyetheretherketone, and combinations thereof.

The insulative cover is envisioned to be manufactured utilizing a molding process, such as compression molding. However, it is contemplated the insulative cover may also be manufactured using other molding processes and techniques which include injection molding, transfer molding, blow molding, extrusion, and other molding and manufacturing methods.

In order to impart resistance to abrasions and water, the insulative cover may further include an outer layer in the form of a coating, such as a polyester coating or a polyurethane coating.

According to another embodiment, the insulative cover may be constructed of a material allowing said cover to be adapted and configured to be wrapped around the oil filter OF in a snug-fitting manner, whereby the cover flexibly conforms to and adapts to the outer contour and shape of the oil filter OF. Once the cover is removed from the oil filter OF, the returnably-resilient quality of the cover material allows the cover to return to its resting shape (generally planar).

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations.

Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What is claimed is:
1. A heat-transferring jacket comprising:
   a body, the body comprising:
      a first lateral terminus;
      a second lateral terminus;
      an inner-wall and an outer-wall, the inner-wall comprises a first longitudinal terminus and the outer-wall comprises a second longitudinal terminus, the first longitudinal terminus is separated spatially from the second longitudinal terminus by an opening, and wherein the body further comprising a plurality of fins disposed between the first and second lateral terminuses;

an air-intake inlet through which cool air enters, the air-intake is formed in the body approximately a midpoint between the first lateral terminus and the second lateral terminus;

a plurality of air-exhaust outlets formed along the first lateral terminus and the second lateral terminus, the plurality of air-exhaust outlets provide openings through which heat and heated air is released to the atmosphere; and means for securing the body to an oil filter, wherein the means for securing the body to an oil filter comprises a pair of supports disposed substantially parallel to an arrangement of the plurality fins, wherein the pair of supports includes a plurality of indexing apertures through which mechanical fasteners are received and tightened which securely clamps the first longitudinal terminus and the second longitudinal terminus together and compresses and tightens the body of the jacket about the external circumferential surface of the oil filter.

2. The heat-transferring jacket of claim 1, wherein the plurality of fins is disposed between the inner-wall and the outer-wall in a traverse arrangement, and wherein the plurality of fins substantially circumscribe a top-half portion and a bottom half portion of the body, thereby forming a channel circumscribing the outer-wall of the body, the channel is in fluid communication with the air intake inlet, and wherein the body is slid over the free end of an oil filter such that an external circumferential surface of the oil filter engages the inner-wall of the body.

3. A heat-transferring jacket comprising:

a body comprising a first lateral terminus and a second lateral terminus, the body further comprising an inner-wall having an inner circumference and an outer circumference, the inner-wall comprises a first longitudinal terminus and a second longitudinal terminus, the first longitudinal terminus is separated spatially from the second longitudinal terminus by an opening, and wherein the body comprising a plurality of fins mutually coupled with outer circumference of the inner-wall, the plurality of fins substantially circumscribe a top-half portion and a bottom-half portion of the outer circumference of the body, and wherein the plurality of fins comprises a plurality of vents arranged along a longitudinal length of the plurality of fins;

an air-intake inlet formed in the body;

a plurality of air-exhaust outlets formed along the first lateral terminus and the second lateral terminus of the body, the plurality of air-exhaust outlets provide openings through which heat and heated air is released to the atmosphere; and means for securing the body to an oil filter, wherein the means for securing the body to an oil filter comprises a pair of supports disposed substantially parallel to an arrangement of the plurality fins, wherein the pair of supports includes a plurality of indexing apertures through which mechanical fasteners are received and tightened which securely clamps the first longitudinal terminus and the second longitudinal terminus together and compresses and tightens the body of the jacket about the external circumferential surface of the oil filter.

4. The heat-transferring jacket of claim 3, wherein the plurality of fins is arranged perpendicular to a longitudinal axis of the plurality of fins.

5. The heat-transferring jacket of claim 3, wherein the plurality of fins is arranged parallel to a longitudinal axis of the plurality of fins.

6. The heat-transferring jacket of claim 3, wherein the body is slid over the free end of the oil filter such that an external circumferential surface of the oil filter engages the inner circumference of the inner-wall of the body.

7. An oil filter comprising:

a canister housing coupled to a base plate having a gasket retainer and expandable gasket seal, the housing and base plate comprising a center tube having filter media and one or more bypass means; and a heat-transferring jacket coupled to the housing, the jacket comprising:

a body, the body comprising:

a first lateral terminus;

a second lateral terminus;

an inner-wall and an outer-wall, the inner-wall comprises a first longitudinal terminus and the outer-wall comprises a second longitudinal terminus, the first longitudinal terminus is separated spatially from the second longitudinal terminus by an opening, and wherein the body further comprises a plurality of fins disposed between the first and second lateral terminuses;

an air-intake inlet formed in the body;

a plurality of air-exhaust outlets formed along the first lateral terminus and the second lateral terminus, the plurality of air-exhaust outlets provide openings through which heat and heated air is released to the atmosphere; and means for securing the body to the oil filter, wherein the means for securing the body to an oil filter comprises a pair of supports disposed substantially parallel to an arrangement of the plurality fins, wherein the pair of supports includes a plurality of indexing apertures through which mechanical fasteners are received and tightened which securely clamps the first longitudinal terminus and the second longitudinal terminus together and compresses and tightens the body of the jacket about the external circumferential surface of the oil filter.

* * * * *